United States Patent [19]

Uchida

[11] 3,912,835

[45] Oct. 14, 1975

[54] PROCESS OF REINFORCING PAPER

[75] Inventor: Takeshi Uchida, Toyonaka, Japan

[73] Assignee: Nichimen Co., Ltd., Japan

[22] Filed: Sept. 20, 1973

[21] Appl. No.: 399,078

[52] U.S. Cl............ 427/316; 260/33.8 UA; 427/439
[51] Int. Cl.².. C08F 33/02; D21H 3/40; D21H 3/80
[58] Field of Search................. 117/47 H, 155 UA; 260/33.8 UA; 427/316, 439

[56] References Cited
UNITED STATES PATENTS

| | | | |
|---|---|---|---|
| 1,286,057 | 11/1918 | Moore | 117/47 H |
| 2,812,269 | 11/1957 | Ransburg | 117/47 H |
| 3,479,213 | 11/1969 | Takeda | 117/155 |

Primary Examiner—Michael R. Lusignan

[57] ABSTRACT

A process of reinforcing corrugated cardboard materials and other kinds of paper(hereinafter also called "paper to be processed") by impregnating them with plastics. The paper to be processed is dried to a predetermined water content and then dipped in a solution made by dissolving between about 1 and about 20% by weight of resin in a hydrocarbon halogenide solvent. The paper impregnated with the solution thereafter is dried to obtain a desired reinforced paper. The resin to be dissolved in the solution is selected from a group consisting of polystyrene, acrylonitrile-styrene copolymer, acrylic resin and acrylonitrile-butadiene-styrene resin.

1 Claim, No Drawings

PROCESS OF REINFORCING PAPER

BACKGROUND OF THE INVENTION

This invention relates to a process of reinforcing paper such as corrugated cardboard, pasteboard and other thick or thin paper of various kinds.

Corrugated cardboard sheets, corrugated cardboard cases, paper cases and other kinds of paper adapted for various uses generally are devoid of a waterproof property. Once these corrugated cardboards etc. have absorbed water, they are more or less deformed and their physical properties required for achieving their respective purposes are lost or extremely impaired. Even a slight moisture absorbed therein deforms them and accuracy in their dimensions is no longer maintained.

Known in the art of reinforcing papers for affording them a water-proof property is a process which consists of dipping a corrugated cardboard sheet etc. in a polycarbonate solution (a solution made by dissolving a suitable ratio of polycarbonate in a solvent consisting of methylene chloride, ethylene chloride or the like) so that the corrugated cardboard etc. are impregnated or coated with the polycarbonate solution. This prior art process, however, is disadvantageous in that polycarbonate is hard to dissolve in the methylene chloride or ethylene chrolide solvent and a suitable pentetrating agent must be added for obtaining the required solution.

SUMMARY OF THE INVENTION

It is therefore an object of the invention to eliminate the above described disadvantage of the prior art process of reinforcing paper.

It is another object of the invention to provide a reinforcing process capable of producing a strong and highly water-proof paper.

It is another object of the invention to provide a solution for reinforcing paper by coating or impregnating the paper therewith.

DETAILED DESCRIPTION OF THE INVENTION

A preferred embodiment of the invention will now be described hereinbelow.

Liners and/or corrugated sheets which are materials for manufacturing a corrugated cardboard or any other paper to be treated by the process according to the invention are dried by a drying machine to a water content of less than 5%. The liner or the corrugated sheet of a corrugated cardboard normally contains 6–10% of water.

Nextly, the paper adjusted in its water content to the above described ratio is dipped in the solution made according to the invention for about one to twenty seconds.

This solution is made by dissolving between about 1 and about 20% by weight of polystyrene, acrylonitrile-styrene copolymer, acrylic resin or acrylonitrile-butadiene-styrene resin in a hydrocarbon halogenide solvent.

As the paper to be processed is dipped in this solution for about one to twenty seconds, the solution adheres to the surface of the paper to be processed as well as penetrates into the paper. The paper to be processed is thereafter dried by a drying machine to obtain a desired plastics reinforced paper. Quantity of the plastics applied to the paper can be known by measuring difference in the weight of the dried paper before it is dipped in the solution and the dried paper after it is dipped in the solution. In a case wherein water (less than 5%) contained in the paper is removed to some extent from the paper due to osmotic pressure of the solution, a larger amount of plastics than the measured difference in the weight is contained in the paper.

The quantity of the resin to be dissolved in the solvent should preferably be about 1 to 20% by weight. If the ratio is less than 1%, the solution will be too thin to attain the object of the invention. If, on the other hand, the ratio is above 20%, the solution will be too thick to penetrate smoothly into the paper to be processed. Time during which the paper is dipped in the solution should preferably be one to twenty seconds because a dipping time shorter than that will be insufficient to attain the object and a longer time will cause saturation with a result that productivity will be adversely affected. It should be noted that concentration of the solution is in inverse proportion to the dipping time for the purposes of the invention and proper density and dipping time should be selected according to quality, thickness and other characteristics of the paper to be processed.

The following examples illustrate the invention:

EXAMPLE I

A liner and a corrugated sheet made as materials of a corrugated cardboard are dried by a drying machine to water content of less than 5%. Then the dried liner and corrugated sheet are dipped for five seconds in a solution made by dissolving 10% by weight of an acrylic resin in a hydrocarbon halogenide solvent. The paper thereafter is dried through a drier to obtain a desired reinforced paper.

Properties of the reinforced paper produced in the above described manner are shown in the following table:

Strength Test for Liners

| | | Treated material | |
| --- | --- | --- | --- |
| | Untreated material | Before soaking in water | After soaking in water for three hours |
| Burst factor (Kg/cm²) | 4.46 | 7.54 | 1.29 |
| Breaking Strength | 2.41 | 3.40 | 0.602 |
| Ring crush (Kg) | 45.1 | 66.2 | — |
| Sizing degree (Sec.) | 130 | 858 | — |
| Water absorption (%) | — | — | 33.1 |

Strength Test for Corrugated Sheets

| | | Treated material | |
| --- | --- | --- | --- |
| | Untreated material | Before soaking in water | After soaking in water for three hours |
| Burst factor (Kg/cm²) | 1.93 | 4.29 | 0.85 |
| Breaking Strength | 1.41 | 2.65 | 0.540 |
| Ring crush (Kg) | 23.4 | 55.9 | — |
| Sizing degree (Sec.) | 4 | 55.0 | — |
| Water absorption (%) | — | — | 32.4 |

It will be apparent from these tables that the paper treated by the process according to the invention is remarkably superior in burst factor, breaking strength, ring crush and sizing degree to the untreated paper. It will also be noted that the paper reinforced by the inventive process does not entirely lose its properties even after soaking it in water for three hours.

The above tables merely show the best results that were obtained in the test conducted with various combinations of dipping time and concentration of solution in which acrylic resin is used. It will therefore be understood that the scope of the invention is not limited to the above described example. More specifically, polystyrene, acrylonitrile-styrene copolimer or acrylonitrile-butadiene-styrene resin may be effectively employed as a resin to be dissolved in the solvent. Depending upon the concentration and the dipping time which are respectively selected within the ranges of 1–20% and 1–20 seconds, a reinforced paper having properties resembling those shown in the above tables can be obtained.

The process according to the invention is applicable not only to the corrugated cardboard materials as described hereinabove but to other kinds of paper having various thicknesses.

According to the inventive reinforcing process described in the foregoing, the solution penetrates smoothly into the paper to be processed without requirement of any penetrating agent so that the paper is sufficiently impregnated with the solution within a very short time. Further, since the reinforced paper obtained by the inventive process is impregnated and coated with the plastics, the paper has excellent waterproof property and strength. Accordingly, the loss of required properties of the paper due to absorption of water is completely avoided. Thus, the reinforced paper is particularly useful when it is utilized as a container for frozen foods, fresh fish etc.

If acrylic resin is used for making the solution, a reinforced paper which has not only light weight and weather-proof features but also a hard surface with lustre is provided.

What is claimed is:

1. A process of reinforcing paper comprising the steps of drying paper to a moisture content of less than 5%, dipping said paper for about 1 second to about 20 seconds in a solution made by dissolving between about 1 and about 20% by weight of a resin selected from the group consisting of polystyrene, acrylonitrile-styrene copolymer, acrylic resin and acrylonitrile-butadiene-styrene resin in a hydrocarbon halogenide solvent, and thereafter drying said paper to obtain a reinforced paper.

* * * * *